(12) United States Patent
Taylor et al.

(10) Patent No.: US 7,425,019 B2
(45) Date of Patent: Sep. 16, 2008

(54) AIRBAG AND PROCESS FOR MANUFACTURE OF AN AIRBAG

(75) Inventors: Ian Taylor, Cheshire (GB); Yves Puccetti, Cheshire (GB); Marc Phillips, Beauvais (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/329,969

(22) Filed: Jan. 11, 2006

(65) Prior Publication Data
US 2006/0192369 A1 Aug. 31, 2006

(30) Foreign Application Priority Data
Jan. 12, 2005 (DE) .................. 10 2005 001 598

(51) Int. Cl.
B60R 21/22 (2006.01)
(52) U.S. Cl. .................. 280/730.2; 280/729; 280/743.1
(58) Field of Classification Search ............. 280/730.2, 280/729, 743.1, 742, 740
See application file for complete search history.

(56) References Cited

U.S. PATENT DOCUMENTS

| 5,803,485 | A | | 9/1998 | Acker et al. | |
|---|---|---|---|---|---|
| 5,984,348 | A | | 11/1999 | Specht et al. | |
| 6,007,091 | A | * | 12/1999 | Westrich | 280/730.2 |
| 6,073,961 | A | | 6/2000 | Bailey et al. | |
| 6,155,597 | A | * | 12/2000 | Bowers et al. | 280/730.2 |
| 6,199,898 | B1 | | 3/2001 | Masuda et al. | |
| 6,203,058 | B1 | | 3/2001 | Elqadah et al. | |
| 6,227,561 | B1 | | 5/2001 | Jost et al. | |
| 6,231,073 | B1 | | 5/2001 | White, Jr. | |
| 6,237,941 | B1 | | 5/2001 | Bailey et al. | |
| 6,273,456 | B1 | | 8/2001 | Heigl | |
| 6,276,712 | B1 | | 8/2001 | Welch et al. | |
| 6,293,581 | B1 | | 9/2001 | Saita et al. | |
| 6,299,199 | B1 | | 10/2001 | Bowers et al. | |
| 6,336,654 | B1 | | 1/2002 | Stein et al. | |
| 6,409,211 | B1 | | 6/2002 | Sheng et al. | |
| 6,428,037 | B1 | | 8/2002 | Bakhsh et al. | |
| 6,431,587 | B1 | | 8/2002 | O'Docherty | |
| 6,450,529 | B1 | * | 9/2002 | Kalandek et al. | 280/730.2 |
| 6,457,740 | B1 | | 10/2002 | Vaidyaraman et al. | |
| 6,464,250 | B1 | | 10/2002 | Faigle et al. | |
| 6,530,595 | B2 | * | 3/2003 | Masuda et al. | 280/730.2 |
| 6,755,436 | B2 | * | 6/2004 | Hess et al. | 280/730.2 |
| 6,860,507 | B2 | * | 3/2005 | Uchiyama et al. | 280/730.2 |

(Continued)

FOREIGN PATENT DOCUMENTS

DE 199 39 618 A1 5/2000

(Continued)

Primary Examiner—Kevin Hurley
Assistant Examiner—Drew J. Brown
(74) Attorney, Agent, or Firm—Brinks Hofer Gilson & Lione

(57) ABSTRACT

The present invention relates to an airbag and a process for manufacturing an airbag. The airbag includes a distribution element for the gas of a gas generator, to which at least one multi-layer chamber is fluidly connected through outflow openings of the distribution element. The distribution element includes an acceptance device for the gas generator and is cut out of an airbag material and is sewn to form a hollow body At least two connecting seams are provided to connect the layers of the chambers separately with one layer each of the distribution element.

16 Claims, 2 Drawing Sheets

U.S. PATENT DOCUMENTS

| | | | |
|---|---|---|---|
| 6,962,364 B2 * | 11/2005 | Ju et al. | 280/730.2 |
| 7,163,233 B2 * | 1/2007 | Kino | 280/730.2 |
| 2001/0019201 A1 | 9/2001 | Masuda et al. | |
| 2001/0045729 A1 | 11/2001 | Mueller | |
| 2002/0014762 A1 | 2/2002 | Bakhsh et al. | |
| 2002/0020991 A1 | 2/2002 | Tanase et al. | |
| 2002/0036395 A1 | 3/2002 | Bakhsh et al. | |
| 2002/0036396 A1 | 3/2002 | Fischer | |
| 2002/0056974 A1 | 5/2002 | Webert | |
| 2002/0105173 A1 | 8/2002 | Saderholm et al. | |
| 2002/0105174 A1 | 8/2002 | Tanase et al. | |
| 2002/0140211 A1 | 10/2002 | Takahara | |
| 2002/0163167 A1 | 11/2002 | Hill | |
| 2002/0175502 A1 | 11/2002 | Tesch et al. | |
| 2002/0195804 A1 | 12/2002 | Hess et al. | |
| 2005/0006881 A1 * | 1/2005 | Charpentier | 280/730.2 |
| 2005/0006888 A1 * | 1/2005 | Yamanaka | 280/743.1 |
| 2005/0206137 A1 * | 9/2005 | Takimoto | 280/729 |
| 2006/0108776 A1 * | 5/2006 | Bradbum | 280/730.2 |

FOREIGN PATENT DOCUMENTS

| | | |
|---|---|---|
| DE | 100 21 576 A1 | 11/2000 |
| DE | 200 15 065 U1 | 2/2001 |
| DE | 200 16 717 U1 | 3/2001 |
| EP | 0 832 795 A1 | 4/1998 |
| EP | 1 122 134 A1 | 8/2001 |
| EP | 1 228 930 A2 | 8/2002 |
| EP | 1 238 865 A2 | 9/2002 |
| GB | 2 314 300 A | 12/1997 |
| GB | 2 357 467 A | 6/2001 |
| JP | 2000-85515 | 3/2000 |
| JP | 2000-335356 A | 12/2000 |
| JP | 2003-063348 | 3/2003 |
| WO | WO 99/42333 | 8/1999 |
| WO | WO 02/058970 A1 | 8/2002 |
| WO | WO 03/018372 A1 | 3/2003 |
| WO | WO 03/051680 A1 | 6/2003 |
| WO | WO 2004/000609 A1 | 12/2003 |
| WO | WO 2004/007250 A1 | 1/2004 |
| WO | WO 2004/026640 A1 | 4/2004 |
| WO | WO 2004/094199 A1 | 11/2004 |
| WO | WO 2004/106122 A1 | 12/2004 |

* cited by examiner

AIRBAG AND PROCESS FOR MANUFACTURE OF AN AIRBAG

CROSS REFERENCE TO RELATED APPLICATIONS

This application claims priority to German patent application 10 2005 001 598.0, filed Jan. 12, 2005.

BACKGROUND

1. Field of the Invention

The invention relates to an airbag, particularly to an airbag for use in a motor vehicle arranged relative to a head and shoulder area, of a vehicle occupant. This type of airbag is particularly located in the roof area of a motor vehicle and serves to protect the head and shoulder area during a side impact, such airbags unfold downwards and are also called "inflatable curtains". In other applications this type of airbag can also be located in the vehicle door and unfold upwards.

The invention also relates to a process for manufacturing an airbag, in particular an airbag for the head and shoulder area, with a distribution element for gas of a gas generator and with at least one inflatable, multi-layer chamber, which can be filled with the gas of a gas generator and is connected from the point of view of flow with exit openings of the distribution element, which exhibits at least one acceptance device for the gas generator and which is sewn onto the airbag.

2. Description of Related Art

A protective cushion for the head of a vehicle occupant is known from U.S. Pat. No. 6,199,898 which can guide gas into chambers simultaneously or can guide gas between the chambers with a desired time delay. The cushion includes an interior layer and a layer on the vehicle body side, which are located above one another and are sewn together in order to create chambers between the layers. A distribution element is located between the top sections of the layers. Gas is delivered through a rear end of the distribution element and is delivered into the chambers through outflow openings. The distribution element and the two layers of the chambers are closed with a common seam.

Another generic airbag system is known from US 2004/0104561 A1. Here too, the chambers are formed of fabric pieces which are sewn to form a hollow body by means of a circumferential seam. The distribution element is completely sewn into the airbag.

A disadvantage of the above airbag is the fact that the circumferential seam of the chambers has a high degree of elasticity and therefore a high leakage rate. Furthermore, displacement of a filling nozzle to be connected to the gas generator from an outer to a central position also requires modification of the upper connecting seam as well as the upper section of the airbag layers.

Therefore, the task of the present invention is to avoid the disadvantages of the state of the art and provide an improved airbag and a process for its manufacture with which the requirements placed on an airbag during a collision are better fulfilled.

SUMMARY

The airbag of the present invention includes a distribution element for gas of a gas generator and at least one inflatable, multi-layer chamber. The chambers can be filled with the gas of the gas generator and are fluidly connected with outflow openings provided in the distribution element, preferably near the multi-layer chambers. The distribution element includes an acceptance device for the gas generator, and the distribution element is sewn to the airbag. The distribution element is cut out of any airbag material and is configured to form a hollow body.

The distribution element is manufactured using the "cut and sewn" method, where a hollow body is manufactured of a component part or section made from a basic material, by means of sewing. Gas from a gas generator is then able to be directed through the hollow body. This distribution element is subsequently sewn onto the chamber.

The chamber is manufactured using the "one-piece woven" method, which results in increased durability and improved sealing of the chambers, as the fabric layers are no longer joined by means of a seam, but the joint is created by weaving the material together. Longer lifetimes can be achieved in the airbag because the one-piece-woven chamber offers improved sealing resulting in a more gas-tight structure.

In a further development of the invention, the distribution element includes at least one closing seam joining with two layers of the distribution element. In the same way, at least two connecting seams are present at a distance from the closing seam, joining the respective separate layers of the chambers with one respective layer of the distribution element. As opposed to the state of the art, the distribution element is not completely accommodated inside the chambers of the airbag. Rather, the connecting seam between the layers of the distribution element, which are laid on top of one another with each other and are formed separately. This results in only a part of the distribution element, most usefully the part with the outflow openings, is arranged inside the chambers or is covered by the layers of the chamber. Thus, the airbags can be easily adapted to different unfolding characteristics configured for each vehicle type and depending on the kind of accident or collision. Furthermore, the position of the filling nozzle can be selected at will, without influencing the connecting seam.

In order to achieve a fast and well-adapted unfolding and filling of the chambers with the gas of the gas generator, several chambers are sewn onto the distribution element, preferably located relative to where a protective effect is to be provided to a vehicle occupant. It can also be useful to sew chambers onto the distribution element separately from one another so that a chamber for example, will not inflate over, a B pillar where no chamber volume and no protective effect is required. In order to ensure sufficient stability of the airbag if separate chambers are provided coupled with one another, connecting fabric is provided between the chambers, so that the airbag provides a more or less continuous "curtain."

In yet another embodiment of the invention the materials of the distribution element and the chambers are made to exhibit different physical characteristics in order to adapt the airbag to the conditions at any particular time. Relatively high temperatures and high pressure are present in the area of the gas generator, which have to be resisted by the distribution element. Correspondingly, the material in this area is provided with a high degree of strength and temperature-resistance, for example by means of a special type of weave, particular yarns, or by means of a coating. In the distant areas of the chambers, hot gas with be present at relatively low pressure, allowing fabric with a lower degree of strength or thinner yarn to be used, so that the airbag is lighter and can be designed to fit a smaller package when folded.

In order to optimize the airbag to the conditions of a particular application, the distribution element is formed in several parts. Here too, different materials can be used depending on the operating conditions. If, for example, the gas generator is located centrally on the distribution element, it is useful to provide the central area with a very strong, temperature-resistant material, while the edge areas of the distribution element which guide the gas to the chambers through the outflow openings can be manufactured of lower strength, lighter, and less expensive material. Alternatively, the gas generator can be connected at one end of the distribution element, and the distribution element can be formed as one piece.

Another embodiment configures the connecting seam, with which the chamber is attached to the distribution element, to extend over the entire length of the chambers. The chambers, which consist of one piece of fabric and which is open at the side in order to accept the distribution element, forms a basically closed hollow space along with the sewn-on distribution element. Gas can be guided through the outflow openings of the distribution element and into the chambers.

The process of making the present invention provides that one layer respectively of the chamber is sewn to the distribution element via one connecting seam respectively. The distribution element is closed with a closing seam, forming a hollow body. Within this arrangement it is possible for the distribution element to be manufactured of one or several material sections sewn together. It is also possible to provide only one closing seam located outside the chambers in order to form the fabric section of the distribution element which is folded once to form the hollow body.

As an alternative to a one-piece woven design of the chambers, it is possible, after implementation of the closing seam that the chambers are closed with a circumferential seam. This results in the chambers being manufactured according to the cut-and-sewn method.

BRIEF DESCRIPTION OF THE DRAWINGS

In the following text, an embodiment of the invention will be explained in more detail by means of the drawings.

DETAILED DESCRIPTION OF THE INVENTION

Figure 1:
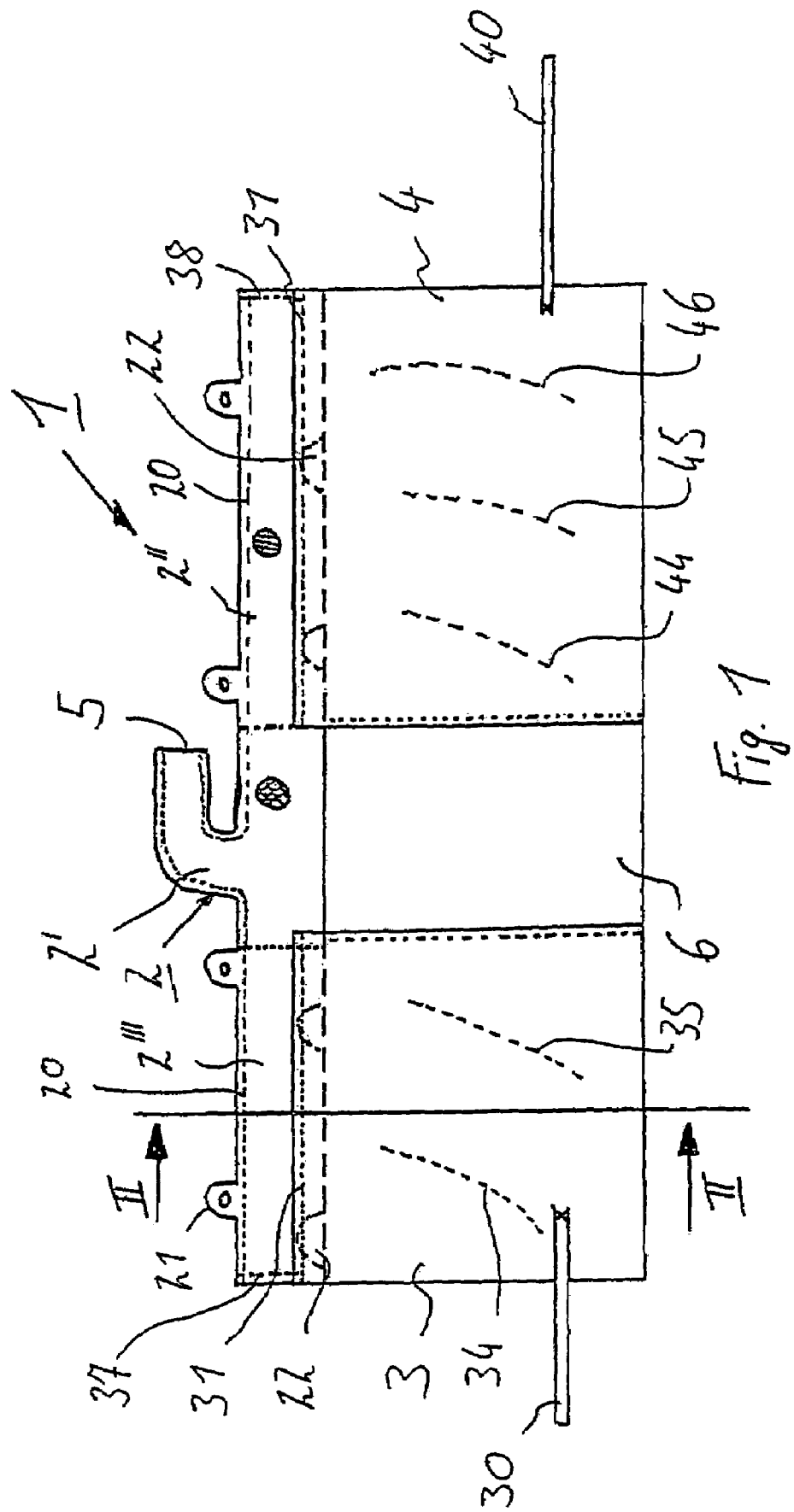
FIG. 1 is a top view of an airbag according to the present invention.

FIG. 1 shows an airbag 1 of the present invention including a distribution element 2 constructed of three partial elements 2', 2", 2''' formed from a conventional airbag material. The embodiment shown includes an acceptance device 5 in the form of an inlet opening for a gas generator (not shown), approximately in the middle of the distribution element 2. Two side partial elements 2" and 2''' are sewn onto the middle partial element 2', which together form a distribution lance for gas produced by the gas generator. The two opposite ends of the distribution lance are closed by seams 37 and 38. Outflow openings 22 are formed in a lower area of the partial elements 2" and 2''', through which the gas can stream into chambers 3 and 4. In the embodiment shown, the chambers 3 and 4 are formed separately as two-layer hollow bodies woven as one piece, and are sewn onto their respective partial elements 2" and 2''' by means of connecting seams 31 and 32.

At the top end of the distribution element 2, which lies opposite the chambers 3 and 4, connection points 21 are provided by means of which the airbag 1 can be fixed, for example, to a roof, frame, or another part of the vehicle body. In the case of an airbag which lies in front of the window of a motor vehicle, tethers 30 and 40 are included on the chambers 3 and 4 in order to provide additional connections to parts of the vehicle body. In the embodiment shown, the front chamber 4 is connected to the A pillar by means of the tethers 40 and the rear chamber 3 is fixed to the C pillar by means of the tethers 30, The gas generator (not shown), and therefore the acceptance device 5 for the gas generator, are located in the area of the B pillar. In so far as the gas generator is not located on the B pillar of the vehicle, the acceptance device 5 is provided at an end area of the distribution element 2.

In the embodiment shown, chambers 3 and 4 are formed separately and joined by means of a connecting fabric 6 which consists of one layer and is therefore light and inexpensive. The connecting fabric 6, which is also located in the area of the B pillar and therefore in an area not to be covered by chambers 3 and 4, may be configured to cover a continuous surface. This makes it possible to effectively prevent the chambers 3 and 4 from folding or moving out of place by means of the tethers 30 and 40 if the side window is destroyed, or objects penetrate in the direction of the vehicle occupants.

Within the chambers 3 and 4, seams 34, 35, 44, 45 and 46 are formed to divide the chambers 3 and 4 into individual inflatable areas. It is possible for the seams 34, 35, 44, 45 and 46 to be formed so as a continuous structure, such that compartments which are separate from one another are formed in the chambers 3 and 4. With this arrangement, the outflow openings 22 are arranged in such a way that each chamber 3 and 4 and, if appropriate, each compartment can be filled as fast as possible.

In FIG. 1 it is indicated that the material of the middle partial element 2' with the acceptance device 5 for the gas generator (not shown) is different from the material of the side partial elements 2" and 2'''. This may be achieved by a different angular run of the yarns; in the middle partial element 2' a 45° run of the yarns is shown, and a run 90° of the yarns is provided for in the side partial elements 2" and 2'''. The middle partial element 2' and side partial elements elements 2" and 2''' can also be manufactured of materials having different yarn thicknesses.

Figure 2:
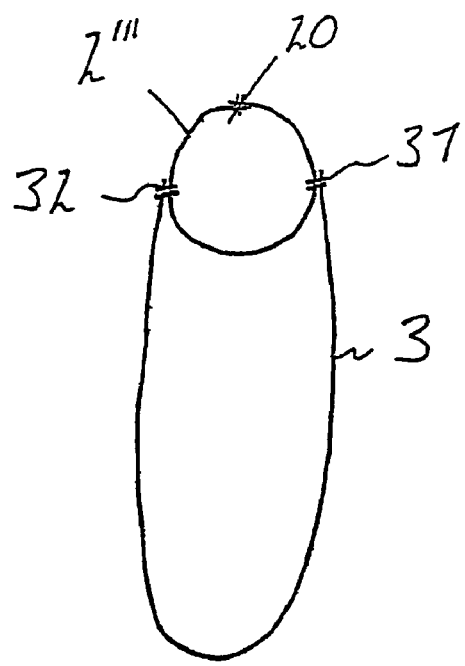
FIG. 2 is a sectional view along Line II-II of the embodiment of FIG. 1.

FIG. 2 shows a cross-section of chamber 3 showing its structure as a one-piece fabric, which is sewn onto the side partial element 2''' via the connecting seams 31 and 32. The fabric of the side partial element 2''' is cut out of the conventional airbag material and is closed so as to form a hollow body by means of a closing seam 20. The connecting seams 31 and 32 are implemented at a distance from a closing seam 20, so that a part of the distribution element 2 is located above the chambers 3 and 4. Only the lower section of the distribution element 2, with outflow openings 22 (see FIG. 1), is covered by the material of the chambers 3 and 4. Thus, two basically hollow bodies are formed by the chambers 3 and 4 as well as the side partial elements 2" and 2''' of the distribution element 2. Instead of a one-piece side partial element 2''' it is possible to form this of two sections with two closing seams.

Figure 3:
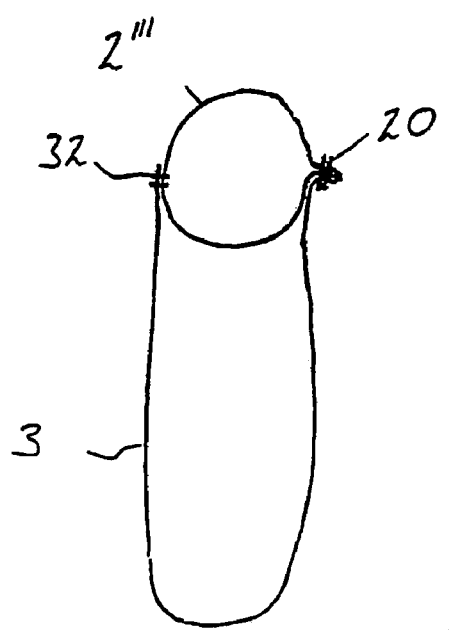
FIG. 3 is an alternative embodiment of FIG. 2.

A variant of the invention is shown in FIG. 3 in which the closing seam 20 forms one of the connecting seams, so that only one additional connecting seam 32 is necessary in order in order to connect the distribution element 2, or the partial element 2''', with the chamber 3. In a two-part form of the side element 2''', the two connecting seams 31 and 32 can form the closing seams at the same time, as shown in FIG. 2, so that the connecting seams 31 and 32 and the closing seams 20 are formed by the same feature.

One possibility of manufacturing an airbag 1 according to the present invention forms the connecting seams 31 and 32 first. After this, the first closing seam 20 is formed to connect two layers of the distribution element 2 or the side partial elements 2'''. After this, if necessary, the second closing seam of the distribution element 2 or the side partial element 2''' is formed. In so far as the chamber 3 was also manufactured using the cut-and-sewn method, the chamber 3 is closed by a circumferential seam while forming a hollow body. If the chamber 3 is woven in one piece, the circumferential seam is excluded.

As an alternative, only one connecting seam 32 may be implemented and the second connecting seam is implemented in the form of the closing seam 20 in order to complete the airbag 1 (see FIG. 3).

The airbag according to the present invention results in chambers 3 and 4 having a longer lifetime because of improved sealing qualities resulting from the use of a single piece of woven material. The lower pressure loads in the chambers 3 and 4 in comparison to the middle partial element 2' make it possible to use non-coated or non-reinforced material for the chambers 3 and 4. This makes possible a lighter and lower-cost implementation of the airbag 1.

In addition, the middle partial element 2' of the distribution element 2 can be provided with a reinforcement or be manufactured of a reinforced airbag material or can be coated in order to resist the high pressure and temperature from the gas generator during unfolding of the airbag 1. The side partial elements 2" and 2''' are sewn onto the middle partial element 2' and are preferably closed at the ends directed away from the middle partial element 2'. The side partial elements 2" and 2''' collect the gas from the gas generator and distribute it to the respective chambers 3 and 4. The size of the outflow openings 22, as well as the dimensions of side partial elements 2" and 2''' allow the gas stream to be controlled, reducing the load on the seams in the chambers 3 and 4 or in the compartments formed therein. The chambers 3 and 4 may be adapted to optimize the unfolding characteristics required each individual application and can also be woven into a one-section piece of material.

The present invention makes possible a combination of coated and non-coated airbag materials, whereby reinforcement need only be applied in those areas where it is required. Elastic seams can be provided in areas of high loads, while woven seams can be provided for areas with low loads resulting in improved lifetimes. Furthermore, the preset invention may be adapted to the respective application, which means that lighter fibers and thinner yarns can be used, which leads to a reduction in weight and packing size. Such an airbag can also be in the form of a side airbag.

While the above description constitutes the preferred embodiment of the present invention, it will be appreciated that the invention is susceptible to modification, variation and change without departing from the proper scope and fair meaning of the accompanying claims.

The invention claimed is:

1. A side impact airbag for use in a motor vehicle to protect a head and shoulder area of a vehicle occupant, the airbag comprising: a two layer distribution element for gas from a gas generator, the distribution element in the form of an elongated hollow body having an upper surface and a lower surface, an acceptance device for the gas generator, at least one inflatable chamber formed of at least two fabric layers of the airbag and which can be filled with the gas from the gas generator, the at least one inflatable chamber being fluidly coupled with outflow openings of the distribution element formed on the lower surface of the distribution element, wherein the distribution element is joined with the at least two fabric layers of the at least one inflatable chamber by at least two separated connecting seams which connect the at least two fabric layers of the at least one inflatable chamber with the distribution element such that the outflow openings are enclosed to communicate with an interior of the at least one inflatable chamber and the upper surface of the distribution element is above the at least one inflatable chamber.

2. An airbag according to claim 1, wherein the at least one inflatable chamber is formed as a single woven piece of fabric material.

3. An airbag according to claim 1, wherein a closing seam connects the two layers of the distribution element and the connecting seams are separated from the closing seam.

4. An airbag according to claim 1 wherein a plurality of the at least one inflatable chambers are sewn onto the distribution element.

5. An airbag according to claim 4, wherein the plurality of the at least one inflatable chambers are sewn onto the distribution element separately from one another.

6. An airbag according to claim 5, wherein a connecting fabric is located between at least two of the inflatable chambers.

7. An airbag according to claim 1, wherein the distribution element and the at least two fabric layers of the at least one inflatable chamber are manufactured of airbag materials having different physical characteristics.

8. An airbag according to claim 1, wherein the distribution element and the at least two fabric layers of the at least one inflatable chamber are manufactured of airbag materials having different physical characteristics.

9. An airbag according to claim 1 wherein the connecting seams extend over an entire length of the at least one inflatable chamber.

10. An airbag according to claim 1 wherein the distribution element airbag material has a higher temperature resistance in an area of the acceptance device than in an area of the outflow openings.

11. An airbag according to claim 1 wherein the distribution element is coupled to the at least one inflatable chamber along the lower surface of the distribution element aligned with the outflow openings.

12. An airbag according to claim 1 wherein connection points are provided on the distribution element for fixing the airbag to an interior of the vehicle.

13. An airbag according to claim 1, wherein the airbag material has a higher tear resistance in the area of the acceptance device for the inflator formed by the distribution element.

14. An airbag according to claim 1, wherein the distribution element and the at least one inflatable chamber are connected such that the upper surface of the distribution element is not enclosed by the at least one inflatable chamber.

15. A process for manufacturing an airbag for use in a motor vehicle, the process comprising: forming a distribution element for gas of a gas generator by joining one or more layers of a first fabric material to form an elongated hollow body and defining an upper surface and a lower surface and further forming a plurality of outflow openings along the lower surface of the distribution element, forming at least one inflatable, multi-layer chamber by forming two layers of a second fabric material which can be filled with the gas of the gas generator, joining the inflatable chamber fabric layers to the distribution element at two separated connecting seams to enclose the outflow openings of the distribution element within the at least one inflatable chamber including connecting the at least one inflatable chamber such that the upper surface of the distribution element is not enclosed by the at least one inflatable chamber, and wherein the distribution element is closed by a closing seam and the connecting seams are located at a distance from the closing seam.

16. The process according to claim 15, wherein the distribution element is closed by a closing seam and the at least one inflatable chamber is closed with a circumferential seam after formation of the closing seam.

* * * * *

UNITED STATES PATENT AND TRADEMARK OFFICE
CERTIFICATE OF CORRECTION

PATENT NO. : 7,425,019 B2
APPLICATION NO. : 11/329969
DATED : September 16, 2008
INVENTOR(S) : Ian Taylor Yves Puccetti and Marc Phillips It is certified that error appears in the above-identified patent and that said Letters Patent is hereby corrected as shown below:

In the Claims

In Claim 8, column 6, line 29, delete "An airbag according to claim 1 wherein the distribution element and the at least two fabric layers of the at least one inflatable chamber are manufactured of airbag materials having different physical charactersitics." and insert --An airbag according to claim 1 wherein the distribution element is made of two or more connected partial elements each made of an airbag material having different physical characteristics--.

Signed and Sealed this

Twenty-fourth Day of February, 2009

JOHN DOLL
*Acting Director of the United States Patent and Trademark Office*